United States Patent
Sakurabu

(10) Patent No.: US 10,649,312 B2
(45) Date of Patent: May 12, 2020

(54) LENS DEVICE, IMAGING APPARATUS, LENS DRIVING METHOD, AND LENS DRIVING PROGRAM

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 16/127,249

(22) Filed: Sep. 11, 2018

(65) Prior Publication Data

US 2019/0007608 A1 Jan. 3, 2019

Related U.S. Application Data

(63) Continuation of application No. PCT/JP2017/003814, filed on Feb. 2, 2017.

(30) Foreign Application Priority Data

Mar. 31, 2016 (JP) .................. 2016-070727

(51) Int. Cl.
  *G03B 13/34* (2006.01)
  *H04N 5/232* (2006.01)
  (Continued)

(52) U.S. Cl.
  CPC ............... *G03B 13/34* (2013.01); *G02B 7/04* (2013.01); *G02B 7/102* (2013.01); *G02B 7/34* (2013.01);
  (Continued)

(58) Field of Classification Search
  CPC ............. H04N 5/2254; H04N 5/23212; H04N 5/232122; H04N 5/23229; G06T 7/50;
  (Continued)

(56) References Cited

U.S. PATENT DOCUMENTS 5,648,836 A * 7/1997 Sato .................. G02B 7/08
  348/345
5,893,651 A * 4/1999 Sakamoto .............. G02B 7/102
  348/240.3

(Continued)

FOREIGN PATENT DOCUMENTS

JP   H1039192    2/1998
JP   2003241077  8/2003

(Continued)

OTHER PUBLICATIONS

"International Preliminary Report on Patentability (Form PCT/IPEA/409) of PCT/JP2017/003814," completed on Oct. 18, 2017, with English translation thereof, pp. 1-8.
"International Search Report (Form PCT/ISA/210) of PCT/JP2017/003814," dated May 9, 2017, with English translation thereof, pp. 1-5.

*Primary Examiner* — Lin Ye
*Assistant Examiner* — Chriss S Yoder, III
(74) *Attorney, Agent, or Firm* — JCIPRNET

(57) ABSTRACT

A lens device includes: a movable lens that is movable in a direction of an optical axis; an operation signal acquisition section that acquires an operation signal corresponding to an amount of movement of an operation member which is movable; a smoothing processing section that smooths the operation signal; and a movable lens driving section that drives the movable lens based on the smoothed operation signal.

20 Claims, 13 Drawing Sheets

(51) Int. Cl.

| | |
|---|---|
| *G03B 3/10* | (2006.01) |
| *G02B 7/34* | (2006.01) |
| *H04N 5/225* | (2006.01) |
| *G02B 7/10* | (2006.01) |
| *G06T 7/50* | (2017.01) |
| *G02B 7/04* | (2006.01) |

(52) U.S. Cl.
CPC ................ *G03B 3/10* (2013.01); *G06T 7/50* (2017.01); *H04N 5/2254* (2013.01); *H04N 5/23212* (2013.01); *H04N 5/23229* (2013.01); *G03B 2205/0046* (2013.01); *H04N 5/232122* (2018.08)

(58) Field of Classification Search
CPC .. G03B 3/10; G03B 13/34; G03B 2205/0046; G02B 7/04; G02B 7/102; G02B 7/34
See application file for complete search history.

(56) References Cited

U.S. PATENT DOCUMENTS

| | | |
|---|---|---|
| 2002/0041334 A1 | 4/2002 | Okawara |
| 2008/0084497 A1 | 4/2008 | Sasaki et al. |
| 2010/0045817 A1 | 2/2010 | Saijo |
| 2014/0002618 A1 | 1/2014 | Nakagome |

FOREIGN PATENT DOCUMENTS

| | | |
|---|---|---|
| JP | 2003279832 | 10/2003 |
| JP | 2005292779 | 10/2005 |
| JP | 2010114521 | 5/2010 |
| JP | 2014011574 | 1/2014 |
| JP | 2016200674 | 12/2016 |

\* cited by examiner

LENS DEVICE, IMAGING APPARATUS, LENS DRIVING METHOD, AND LENS DRIVING PROGRAM

CROSS REFERENCE TO RELATED APPLICATION

This is a continuation of International Application No. PCT/JP2017/003814 filed on Feb. 2, 2017, and claims priority from Japanese Patent Application No. 2016-070727 filed on Mar. 31, 2016, the entire disclosures of which are incorporated herein by reference.

BACKGROUND OF THE INVENTION

1. Field of the Invention

The present invention relates to a lens device, an imaging apparatus, a lens driving method, and a computer readable medium storing a lens driving program.

2. Description of the Related Art

There are known lens systems each having a lens device and an operation device. The lens device includes a movable lens such as a zoom lens, which is movable in the direction of the optical axis so as to change a focal position, or a movable lens which is movable in the direction of the optical axis so as to change a focal length. The operation device is for manually changing a position of the movable lens (refer to JP2003-279832A, JP2003-241077A, and JP2005-292779A). As the operation device, there is a so-called focus demand, zoom demand, or the like that moves the movable lens by rotating a rotatable operation member.

In the lens systems described in JP2003-279832A, JP2003-241077A, and JP2005-292779A, a focus demand or a zoom demand detects an amount of rotation of a knob serving as an operation member, converts the amount of rotation into an electric signal, and transmits the electric signal to the lens device. The lens device moves the movable lens on the basis of the electric signal.

SUMMARY OF THE INVENTION

The operation member described above is manually operated by a photographer. For this reason, it is difficult to stabilize motion of the operation member due to trembling of a hand of a photographer, and a wobble tends to occur in the motion of the operation member. Such a wobble causes a small positional change of the movable lens. Thus, the blur state or the imaging range of the captured image changes little by little, which affects the quality of the captured image.

Particularly in recent years, content production for high resolution broadcasting such as 4K broadcasting or 8K broadcasting is required. In a case of using 4K broadcasting or 8K broadcasting compatible cameras, the influence on the image quality due to unevenness in motion of the operation member becomes remarkable.

The present invention has been made in consideration of the above-mentioned situations, and it is an object of the present invention to provide a lens device, an imaging apparatus, a lens driving method, and a lens driving program capable of improving imaging quality by suppressing a wobble in position of a movable lens caused by an operation of an operation member.

A lens device according to the present invention comprises: a movable lens that is movable in a direction of an optical axis; an operation signal acquisition section that acquires an operation signal corresponding to an amount of movement of an operation member which is movable; a smoothing processing section that smooths the operation signal; and a movable lens driving section that drives the movable lens on the basis of the smoothed operation signal.

An imaging apparatus according to the present invention comprises: the lens device; and an imaging element that captures an image of a subject through the movable lens.

A lens driving method according to the present invention comprises: an operation signal acquisition step of acquiring an operation signal corresponding to an amount of movement of an operation member which is movable and which is for operating a movable lens movable in a direction of an optical axis; a smoothing processing step of smoothing the operation signal; and a movable lens driving step of driving the movable lens on the basis of the smoothed operation signal.

A lens driving program according to the present invention causes a computer to execute: an operation signal acquisition step of acquiring an operation signal corresponding to an amount of movement of an operation member which is movable and which is for operating a movable lens movable in a direction of an optical axis; a smoothing processing step of smoothing the operation signal; and a movable lens driving step of driving the movable lens on the basis of the smoothed operation signal.

According to the present invention, there is provided a lens device, an imaging apparatus, a lens driving method, and a lens driving program capable of improving imaging quality by suppressing a wobble in position of a movable lens caused by an operation of an operation member.

EXPLANATION OF REFERENCES

Figure 1:
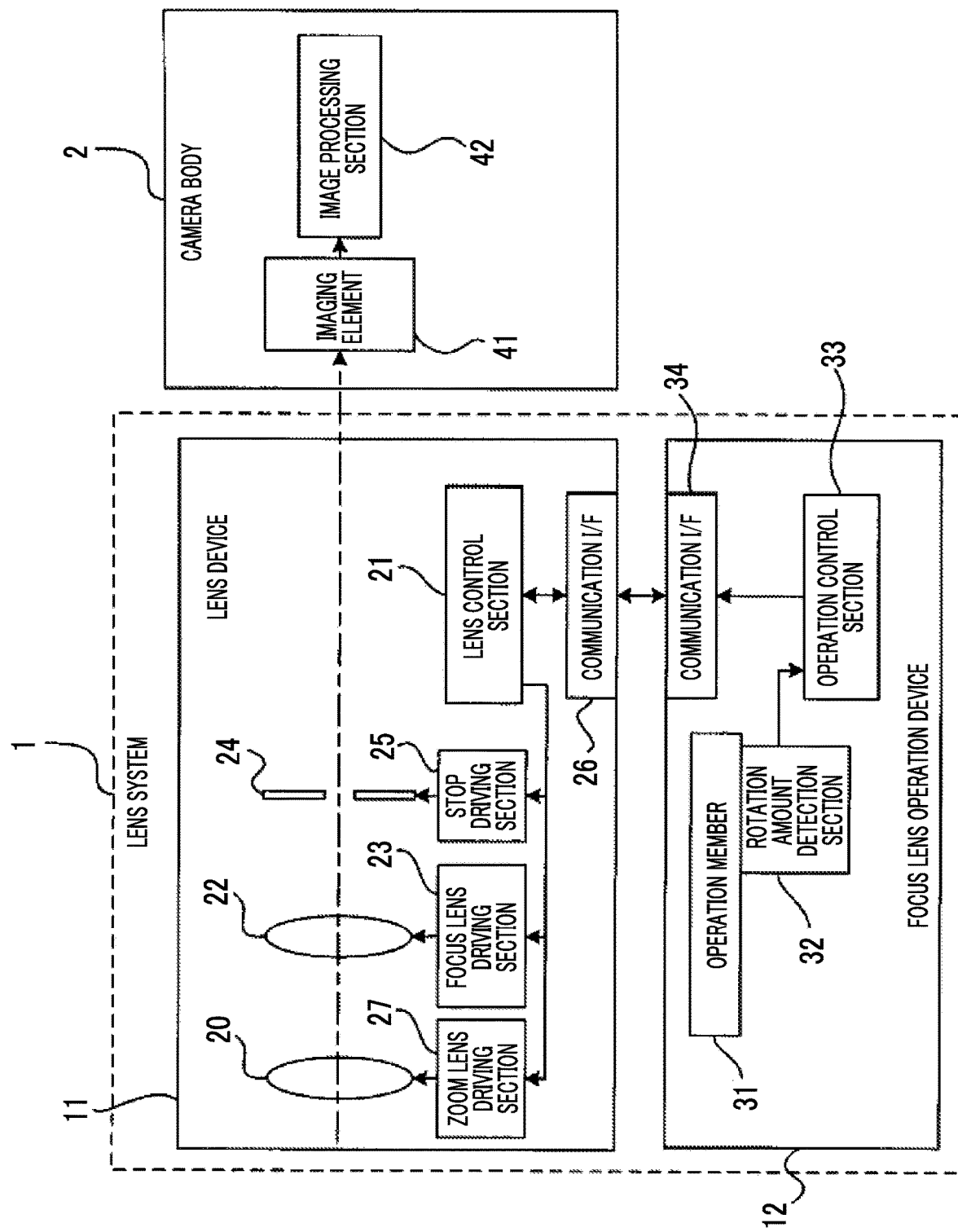
FIG. 1 is a diagram illustrating a schematic configuration of an imaging system which is an embodiment of an imaging apparatus of the present invention.

1: lens system
11: lens device
20: zoom lens
21: lens control section
22: focus lens
23: focus lens driving section
24: stop
25: stop driving section
26: communication I/F
27: zoom lens driving section
12: focus lens operation device
31: operation member
32: rotation amount detection section
33: operation control section
34: communication I/F
2: camera body
41: imaging element
42: image processing section
21a: operation signal acquisition section
21b: depth range calculation section
21c: driving amount generation section
21d: smoothing processing section
21e: movable lens driving section
11A: lens device
21A: lens control section
28: half mirror
29: phase difference detection sensor
21f: phase difference calculation section
21g: change amount calculation section
21C: lens control section
21h: moving object detection section

DESCRIPTION OF THE PREFERRED EMBODIMENTS

Hereinafter, embodiments of the present invention will be described with reference to the drawings.

FIG. 1 is a diagram illustrating a schematic configuration of an imaging system which is an embodiment of an imaging apparatus of the present invention.

The imaging system shown in FIG. 1 comprises: a lens system 1 having a lens device 11 and a focus lens operation device 12; and a camera body 2.

The lens device 11 has a lens control section 21, an imaging optical system including a zoom lens 20, a focus lens 22, and a stop 24, a focus lens driving section 23, a zoom lens driving section 27, a stop driving section 25, and a communication interface (hereinafter abbreviated as I/F) 26.

The lens control section 21 integrally controls the entire lens device 11. The lens control section 21 is mainly composed of a processor, and includes a read only memory (ROM) which stores programs executed by the processor and the like, a random access memory (RAM) as a work memory, and the like. The lens control section 21 implements each function described later by executing a program including the lens driving program stored in the ROM.

The ROM of the lens control section 21 is a computer readable non-transitory storage medium. The program stored in the ROM may be stored in advance at the time of manufacturing the lens device 11, and may be input from an electronic device such as a personal computer, be downloaded to the lens device 11 through the network, and be stored.

The zoom lens 20 is a movable lens which is movable in the direction of the optical axis. The zoom lens is defined as a lens that adjusts the focal length by moving in the direction of the optical axis.

The zoom lens driving section 27 is hardware for adjusting the focal length by moving the zoom lens 20 in the direction of the optical axis under the control of the lens control section 21, and is composed of a motor and the like.

The focus lens 22 is a movable lens movable in the direction of the optical axis. The focus lens is defined as a lens that adjusts the focal position by moving in the direction of the optical axis.

The focus lens driving section 23 is hardware for adjusting the focal position by moving the focus lens 22 in the direction of the optical axis under the control of the lens control section 21, and is composed of a motor and the like.

The stop driving section 25 drives the stop 24 under the control of the lens control section 21 so as to adjust an amount of exposure.

The communication I/F 26 is an interface for communicating with the focus lens operation device 12 wirelessly or by wire. The communication I/F 26 inputs the operation signal, which is received from the focus lens operation device 12, to the lens control section 21.

The focus lens operation device 12 has an operation member 31, a rotation amount detection section 32, an operation control section 33, and a communication I/F 34.

The operation member 31 is a movable member for manually moving the focus lens 22. As the operation member 31, a rotatable member or a slidable member can be exemplified. In the following description, it is assumed that the operation member 31 is a rotatable member.

The rotation amount detection section 32 detects an amount of rotation (in other words, the amount of movement) of the operation member 31 caused in a case where the operator rotates the operation member 31, and outputs the detected amount of rotation to the operation control section 33. The unit of the amount of rotation detected here is indicated by an angle, for example.

The operation control section 33 transmits information on the amount of rotation, which is detected by the rotation amount detection section 32, as an operation signal to the lens device 11 through the communication I/F 34.

The communication I/F 34 is an interface for communicating with the lens device 11 wirelessly or by wire.

The camera body 2 has an imaging element 41 and an image processing section 42.

The imaging element 41 captures an image of a subject through the imaging optical system of the lens device 11 and outputs a captured image signal.

The image processing section 42 performs predetermined signal processing on the captured image signal, which is output from the imaging element 41, thereby generating, for example, a video signal for broadcasting.

Figure 2:
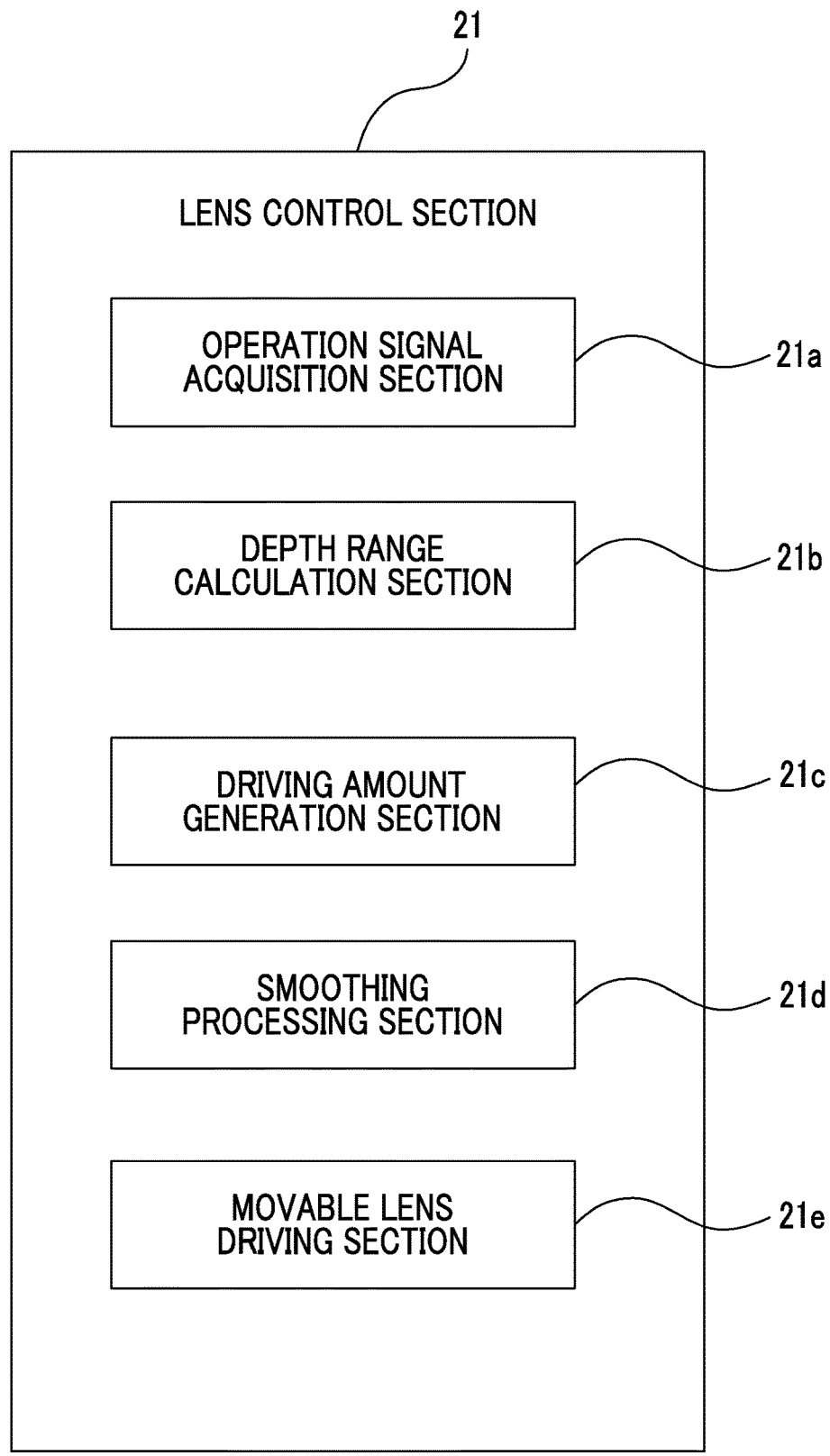
FIG. 2 is a functional block diagram of a lens control section 21 shown in FIG. 1.

FIG. 2 is a functional block diagram of the lens control section 21 shown in FIG. 1.

The lens control section 21 comprises an operation signal acquisition section 21a, a depth range calculation section 21b, a driving amount generation section 21c, a smoothing processing section 21d, and a movable lens driving section 21e. The operation signal acquisition section 21a, the depth range calculation section 21b, the driving amount generation section 21c, the smoothing processing section 21d, and the movable lens driving section 21e are implemented by causing a processor to execute a program.

The operation signal acquisition section 21a acquires the operation signal received by the communication I/F 26 from the focus lens operation device 12.

The depth range calculation section 21b calculates the depth range for being in focus based on the position of the focus lens 22 in the movable range of the focus lens 22 on the basis of the position of the focus lens 22 in the direction of the optical axis, the F number of the stop 24, and the position of the zoom lens 20 in the direction of the optical axis.

The depth range means a range in which it can be determined that the focal point does not substantially change from the state where the focus lens 22 is at the current position in a case where the focus lens 22 is in this range. Specifically, the depth range means a depth of field or a depth of focus.

The depth range includes a first range on the infinity end side starting from the position of the focus lens 22 and a second range on the closest end side starting from the position of the focus lens 22. The sizes of the first range and the second range are the same. The depth range calculation section 21b calculates information which indicates the size of each of the first range and the second range, as the depth range. The depth range is represented by, for example, the number of drive pulses of a motor driving the focus lens 22.

The driving amount generation section 21c generates the amount of driving of the focus lens 22 (specifically, the number of drive pulses of the motor) on the basis of the operation signal acquired by the operation signal acquisition section 21a.

For example, the driving amount generation section 21c reads the amount of driving corresponding to the amount of rotation, which is based on the operation signal acquired by the operation signal acquisition section 21a, from the data indicating the relationship between the amount of rotation of the operation member 31 and the amount of driving of the focus lens 22, thereby generating the amount of driving of the focus lens 22.

Alternatively, the driving amount generation section 21c substitutes the amount of rotation, which is based on the operation signal acquired by the operation signal acquisition section 21a, into the relational expression indicating the relationship between the amount of rotation of the operation member 31 and the amount of driving of the focus lens 22, thereby generating the amount of driving of the focus lens 22 through calculation.

The smoothing processing section 21d smooths the operation signals, which are sequentially acquired by the operation signal acquisition section 21a, through filter processing, and inputs the smoothed operation signals (hereinafter also referred to as a smooth operation signal) to the movable lens driving section 21e. This filter processing is specifically low-pass filter processing.

The smoothing processing section 21d controls the degree of the smoothing performed through the filter processing, on the basis of the ratio of the amount of driving generated by the driving amount generation section 21c to the depth range calculated by the depth range calculation section 21b.

The degree of the smoothing means a cutoff frequency in the low-pass filter processing. As the degree of the smoothing increases, variations in a plurality of operation signals after filtering decrease.

Figure 3:
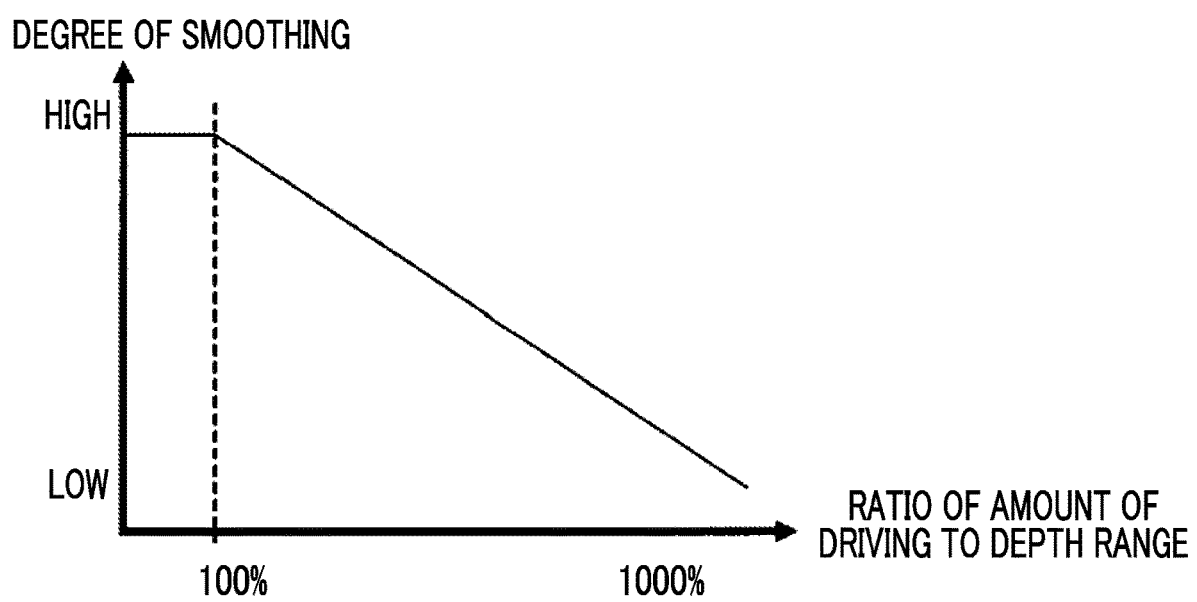
FIG. 3 is a diagram illustrating a relationship between a degree of smoothing and a ratio of an amount of driving to a depth range.

FIG. 3 is a diagram illustrating the relationship between the degree of the smoothing and the ratio of the amount of driving to the depth range. In FIG. 3, the horizontal axis represents the ratio of the amount of driving to the depth range in terms of percentage, and the vertical axis shows the degree of the smoothing.

As shown in FIG. 3, in a case where the ratio of the amount of driving to the depth range is equal to or less than 100%, the smoothing processing section 21d sets the degree of the smoothing to the maximum value. In a case where the ratio of the amount of driving to the depth range is greater than 100%, the smoothing processing section 21d decreases the degree of the smoothing as the ratio increases.

The movable lens driving section 21e controls the focus lens driving section 23 on the basis of the operation signal which is input from the smoothing processing section 21d, thereby driving the focus lens 22.

Specifically, the movable lens driving section 21e generates the amount of driving of the focus lens 22 on the basis of the smooth operation signal in the same manner as the processing content of the driving amount generation section 21c, and moves the focus lens 22 from the current position in accordance with the generated amount of driving.

Hereinafter, the operation of the imaging system shown in FIG. 1 will be described.

Figure 4:
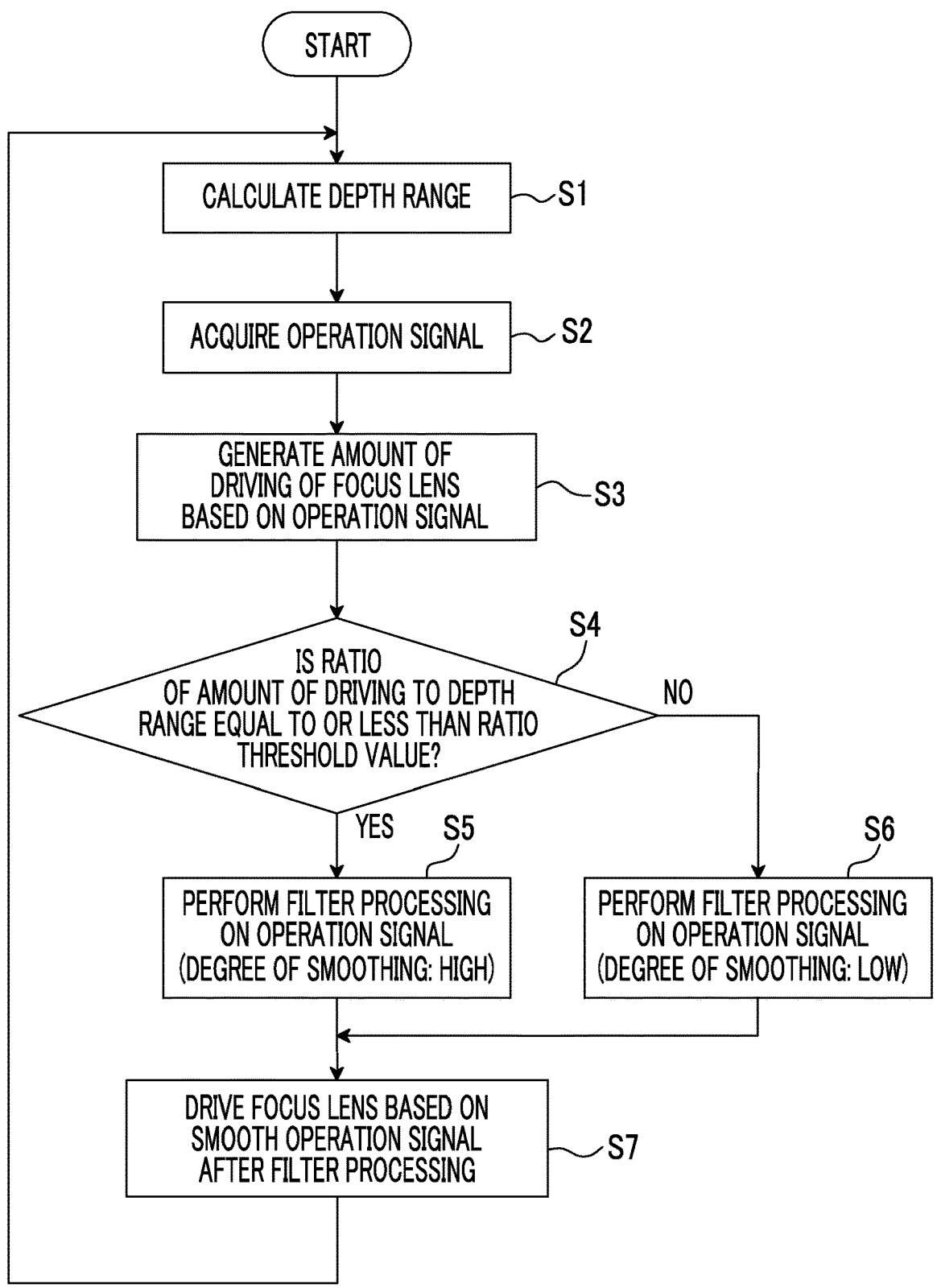
FIG. 4 is a flowchart for explaining lens driving processing executed by a lens control section 21 of a lens device 11 shown in FIG. 1.

FIG. 4 is a flowchart for explaining the lens driving processing executed by the lens control section 21 of the lens device 11 shown in FIG. 1.

In a case where the lens device 11, the focus lens operation device 12 and the camera body 2 are in a communicable state and the imaging system is activated, the depth range calculation section 21b calculates the depth range on the basis of the position of the focus lens 22, the F number of the stop 24, and the position of the zoom lens 20 (step S1). Further, the operation signal acquisition section 21a acquires the operation signal received from the focus lens operation device 12 (step S2).

Next, the driving amount generation section 21c generates the amount of driving of the focus lens 22 on the basis of the operation signal acquired in step S2 (step S3).

Next, the smoothing processing section 21d calculates the ratio of the amount of driving generated in the step S3 to the depth range calculated in the step S1, and determines whether or not the ratio is equal to or less than a predetermined ratio threshold value (step S4). The ratio threshold value described herein is, for example, 100% in the example of control shown in FIG. 3.

In a case of determining that the ratio of the amount of driving to the depth range is equal to or less than the ratio threshold value (step S4: YES), the smoothing processing section 21d sets the degree of the smoothing performed through the filter processing to the maximum value, and smooths the operation signal acquired in step S2 (step S5).

In a case of determining that the ratio of the amount of driving to the depth range is greater than the ratio threshold value (step S4: NO), the smoothing processing section 21d sets the degree of the smoothing performed through the filter processing to a value corresponding to this ratio (a value smaller than the maximum value), and smooths the operation signal acquired in step S2 (step S6).

The movable lens driving section 21e controls the focus lens driving section 23 on the basis of the smooth operation signal smoothed in step S5 or step S6, and drives the focus lens 22 (step S7).

After step S7, the processing returns to step S1 and the above-mentioned processing is repeatedly executed.

As described above, according to the lens device 11 shown in FIG. 1, the smoothing processing section 21d smooths the operation signal, and the focus lens 22 is driven on the basis of the smooth operation signal after smoothing. Therefore, even in a case where the operation signal varies due to trembling of a hand of a photographer who is operating the operation member 31, it is possible to suppress a wobble in position of the focus lens 22. Thereby, it is possible to improve the imaging quality.

Further, according to the lens device 11 shown in FIG. 1, the degree of the smoothing is controlled on the basis of the depth range and the amount of driving which is based on the operation signal. In a case where the ratio of the amount of driving to the depth range is equal to or less than the ratio threshold value, the position of the focus lens 22 is in the vicinity of an in-focus position desired by a photographer. Thus, it is conceivable that a slight shift in focus is not allowed. Consequently, in such a situation, the degree of the smoothing becomes strong. Thus, a wobble in position of the focus lens 22 can be suppressed, and imaging quality can be improved.

On the other hand, in a case where the ratio of the amount of driving to the depth range is greater than the ratio threshold value, the position of the focus lens 22 is located at a position far away from the in-focus position desired by the photographer. Thus, it is conceivable that a shift in focus is allowed. Consequently, in such a situation, the degree of the smoothing decreases. Thus, the responsiveness of driving of the focus lens 22 for the operation of the operation member 31 can be improved. In addition, since smoothing is performed, imaging quality can be prevented from deteriorating.

In the above description, the degree of the smoothing is controlled on the basis of the depth range and the amount of driving of the focus lens which is based on the operation signal. However, the degree of the smoothing is not limited to this. For example, the phase difference may be calculated on the basis of the light having passed through the focus lens 22, and the degree of the smoothing may be controlled on the basis of the depth range and the amount of change in this phase difference.

Figure 5:
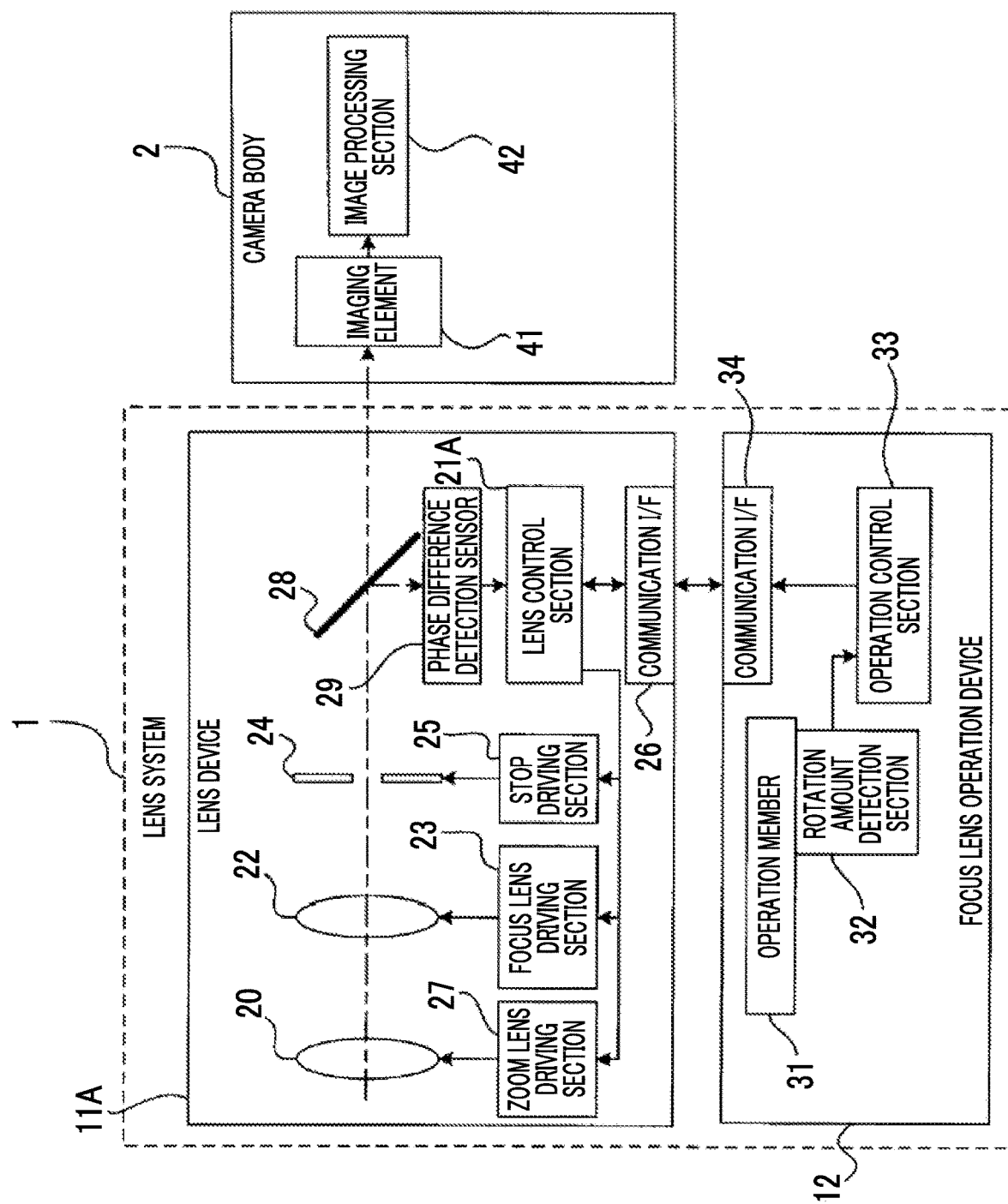
FIG. 5 is a diagram illustrating a modification example of the imaging system shown in FIG. 1.

FIG. 5 is a diagram illustrating a modification example of the imaging system shown in FIG. 1. The imaging system shown in FIG. 5 has the same configuration as that of FIG. 1 except that the lens device 11 is replaced with the lens device 11A.

The lens device 11A is configured such that a half mirror 28 and a phase difference detection sensor 29 are added to the configuration of the lens device 11 and the lens control section 21 is replaced with a lens control section 21A.

The half mirror 28 is disposed on the optical path of the imaging optical system including the zoom lens 20, the focus lens 22, and the stop 24, and reflects a part of the light having passed through the imaging optical system, guides the part of light to the phase difference detection sensor 29, and guides the rest of the light to the imaging element 41.

The phase difference detection sensor 29 is a sensor in which a pair of phase difference detection pixels is arranged two-dimensionally. The phase difference detection pixels respectively receive a pair of light beams passing through different portions of the pupil region of the imaging optical system of the lens device 11A, and photoelectrically converts the pair of light beams.

The lens control section 21A has a processor, a ROM, and a RAM.

Figure 6:
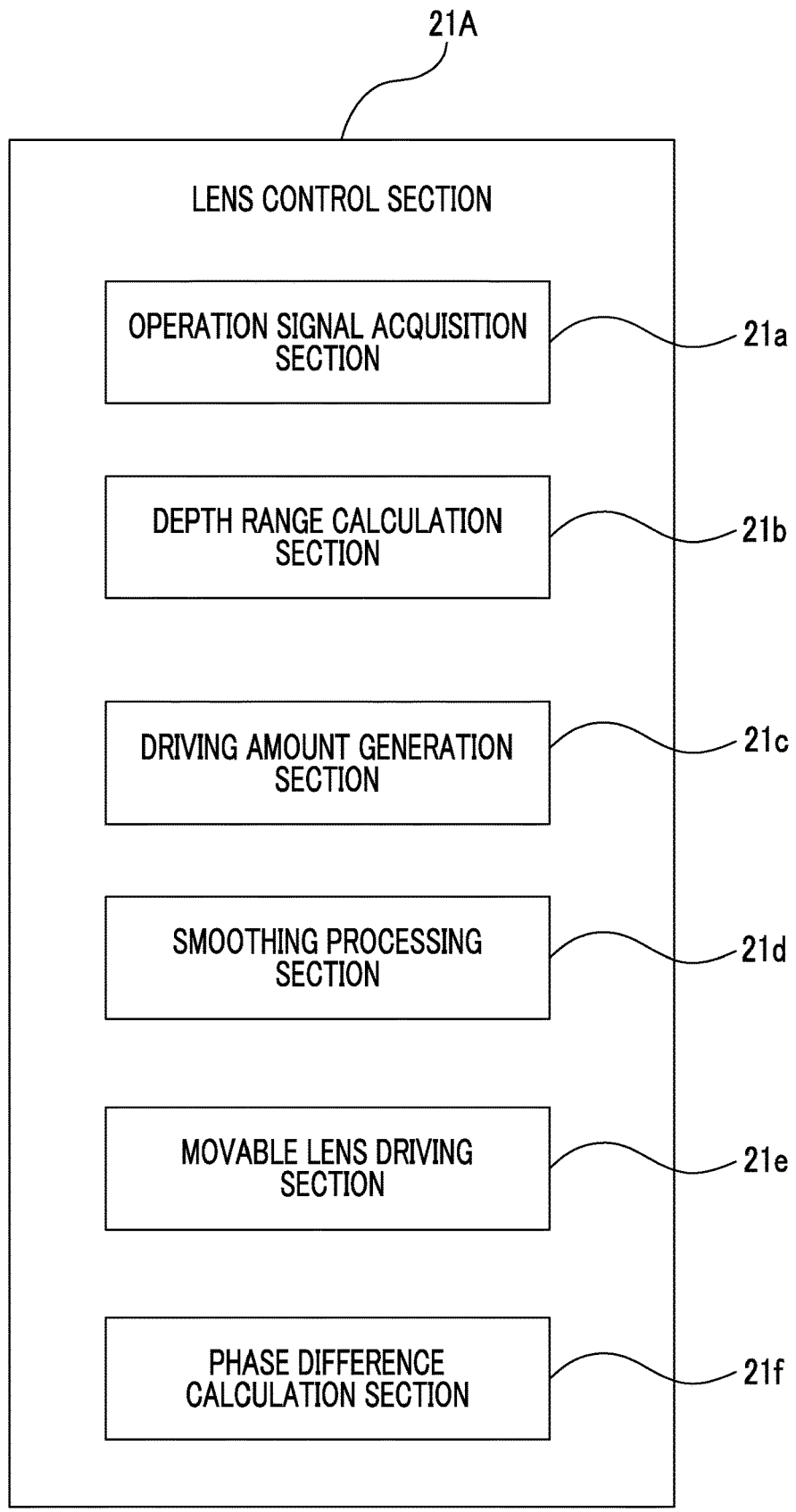
FIG. 6 is a functional block diagram of a lens control section 21A shown in FIG. 5.

FIG. 6 is a functional block diagram of the lens control section 21A shown in FIG. 5. The lens control section 21A shown in FIG. 6 has the same configuration as that of FIG. 2, except that the phase difference calculation section 21f is added and the function of the smoothing processing section 21d is different. Each of the functional blocks shown in FIG. 6 is configured such that the processor of the lens control section 21A executes a program stored in the ROM.

The phase difference calculation section 21f calculates the phase difference through correlation calculation between the pixel signal which is output from one of the pair of phase difference detection pixels of the phase difference detection sensor 29 and the pixel signal which is output from the other of the pair of phase difference detection pixels, and stores the calculated phase difference in the RAM. The phase difference calculation section 21f calculates an amount of change (an absolute value, the unit thereof is a pixel) in phase difference which is the difference between the calculated phase difference and the phase difference calculated immediately before being stored in the RAM, and stores the amount of change in the RAM.

The smoothing processing section 21d of the lens control section 21A smooths operation signals, which are sequentially acquired by the operation signal acquisition section 21a of the lens control section 21A, through the filter processing. This filter processing is specifically low-pass filter processing.

The smoothing processing section 21d of the lens control section 21A controls the degree of the smoothing in the filter processing, on the basis of the latest amount of change in phase difference stored in the RAM and the depth range calculated by the depth range calculation section 21b.

Specifically, the smoothing processing section 21d of the lens control section 21A generates the amount of driving of the focus lens 22 on the basis of the amount of change in phase difference stored in the RAM. The smoothing processing section 21d controls the degree of the smoothing performed through the filter processing on the basis of the ratio of the amount of driving, which is generated from the amount of change in phase difference, to the depth range calculated by the depth range calculation section 21b.

In an example of control of the degree of the smoothing performed by the smoothing processing section 21d, in FIG. 3, the horizontal axis is changed to represent the ratio of the amount of driving of the focus lens 22, which is generated from the amount of change in phase difference, to the depth range.

Figure 7:
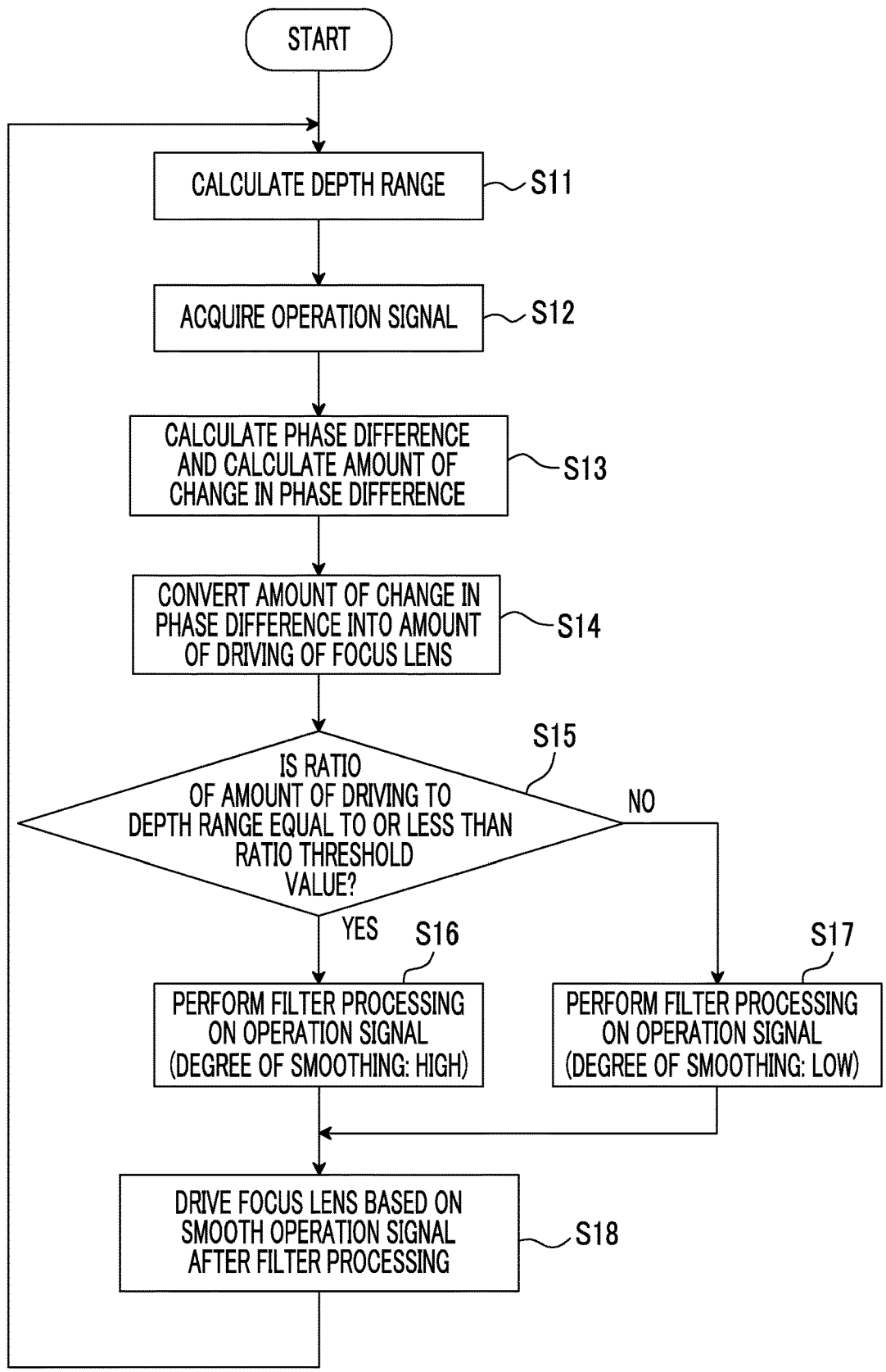
FIG. 7 is a flowchart for explaining lens driving processing executed by the lens control section 21A shown in FIG. 5.

FIG. 7 is a flowchart for explaining the lens driving processing executed by the lens control section 21A shown in FIG. 5.

In a case where the lens device 11A, the focus lens operation device 12 and the camera body 2 are in a communicable state and the imaging system is activated, the depth range calculation section 21b calculates the depth range on the basis of the position of the focus lens 22, the F number of the stop 24, and the position of the zoom lens 20 (step S11). Further, the operation signal acquisition section 21a acquires the operation signal received from the focus lens operation device 12 (step S12).

Next, the phase difference calculation section 21f calculates the phase difference on the basis of the pixel signal which is output from the phase difference detection sensor 29, and calculates the amount of change in phase difference (step S13). The amount of change in phase difference is a difference between the above phase difference and the phase difference calculated immediately before being stored in the RAM.

Next, the smoothing processing section 21d converts the amount of change in phase difference calculated in step S13 into the amount of driving of the focus lens 22 (step S14).

Next, the smoothing processing section 21d calculates the ratio of the amount of driving calculated in step S14 to the depth range calculated in step S11, and determines whether or not this ratio is equal to or less than the ratio threshold value (step S15). The ratio threshold value described herein is, for example, 100% in the example of control shown in FIG. 3.

In a case of determining that the ratio of the amount of driving to the depth range is equal to or less than the ratio threshold value (step S15: YES), the smoothing processing section 21d sets the degree of the smoothing performed through the filter processing to the maximum value, and smooths the operation signal acquired in step S12 (step S16).

In a case of determining that the ratio of the amount of driving to the depth range is greater than the threshold value (step S15: NO), the smoothing processing section 21d sets the degree of the smoothing performed through the filter processing to a value corresponding to the calculated ratio (a value smaller than the maximum value), and smooths the operation signal acquired in step S12 (step S17).

The movable lens driving section 21e controls the focus lens driving section 23 on the basis of the smooth operation signal smoothed in step S16 or step S17, and drives the focus lens 22 (step S18).

After step S18, the processing returns to step S11 and the above-mentioned processing is repeatedly executed.

It can be determined that the situation in which the focus lens 22 is moved largely as the amount of change in phase difference is larger. Consequently, the lens control section 21A controls the degree of the smoothing on the basis of the ratio of the amount of driving (the value converted from the amount of change in phase difference) to the depth range. Thereby, in a manner similar to that of the lens control section 21, it is possible to improve imaging quality and responsiveness.

In the above description, the smoothing processing section 21d constantly performs the smoothing processing on the operation signal, but the present invention is not limited to this. Only in a case where it can be determined that the operation member 31 is rotating at a constant speed, it is also possible to perform the smoothing processing.

Figure 8:
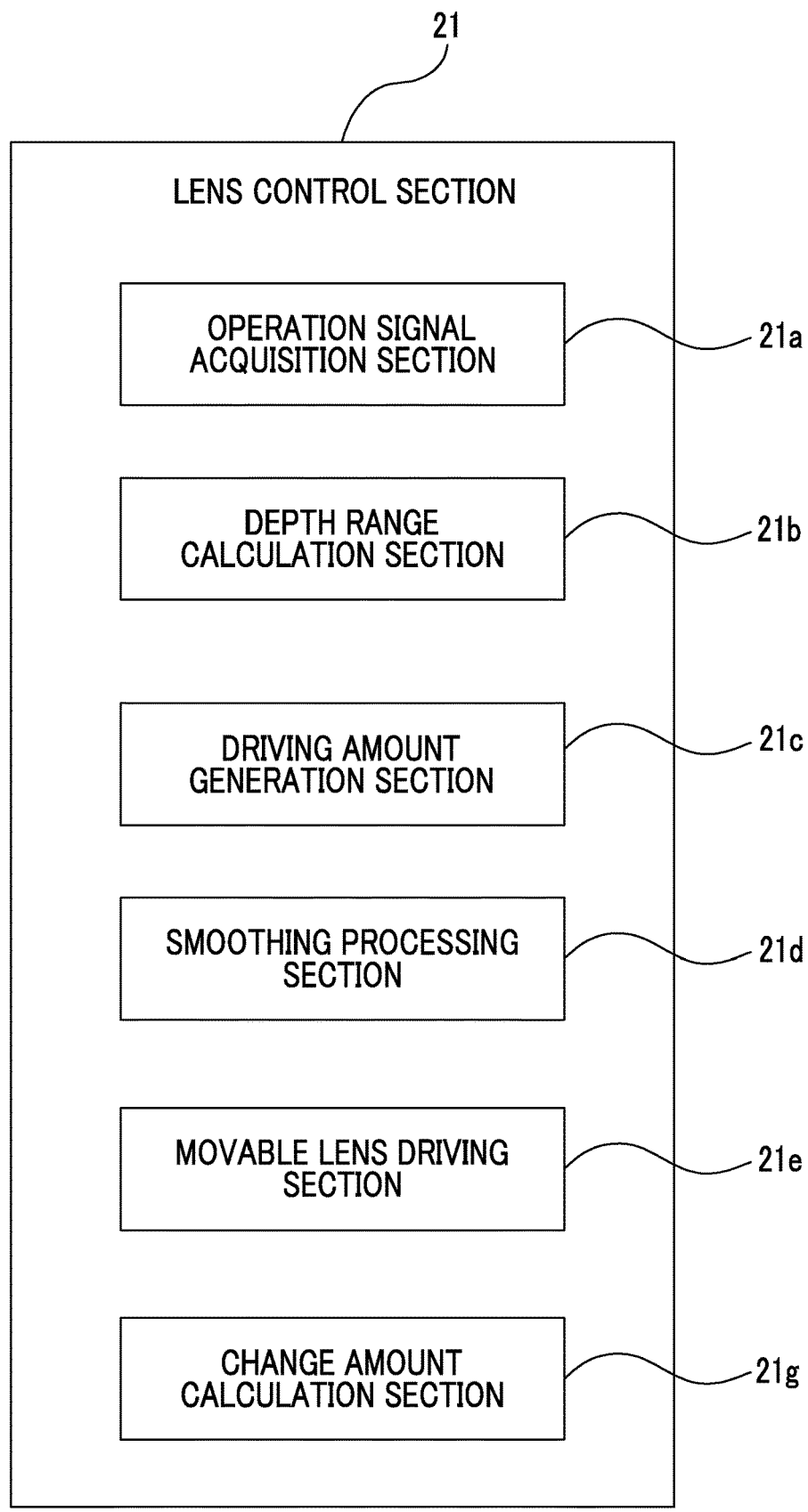
FIG. 8 is a diagram illustrating a modification example of the functional block of the lens control section 21 shown in FIG. 1.

FIG. 8 is a diagram illustrating a modification example of the functional block of the lens control section 21 shown in FIG. 1. The lens control section 21 shown in FIG. 8 has the same configuration as that of FIG. 2 except that a change amount calculation section 21g is added. The change amount calculation section 21g is configured such that the processor of the lens control section 21 executes the program stored in the ROM.

The change amount calculation section 21g calculates the amount of change in amount of rotation of the operation member 31 on the basis of the operation signal acquired by the operation signal acquisition section 21a. The amount of change in amount of rotation of the operation member 31 is a difference between the previous amount of rotation and the current amount of rotation.

The smoothing processing section 21d restricts the operation signal to be subjected to the filter processing on the basis of the amount of change calculated by the change amount calculation section 21g.

Specifically, in a case where the absolute value of the amount of change calculated by the change amount calculation section 21g is equal to or less than a change threshold value, the smoothing processing section 21d performs filter processing on the operation signal, and inputs the smooth operation signal to the movable lens driving section 21e. In a case where the absolute value of the amount of change calculated by the change amount calculation section 21g is greater than the change threshold value, the filter processing is not performed on the operation signal, and the operation signal is directly input to the movable lens driving section 21e.

The movable lens driving section 21e drives the focus lens 22 on the basis of the operation signal or the smooth operation signal which are input from the smoothing processing section 21d.

Figure 9:
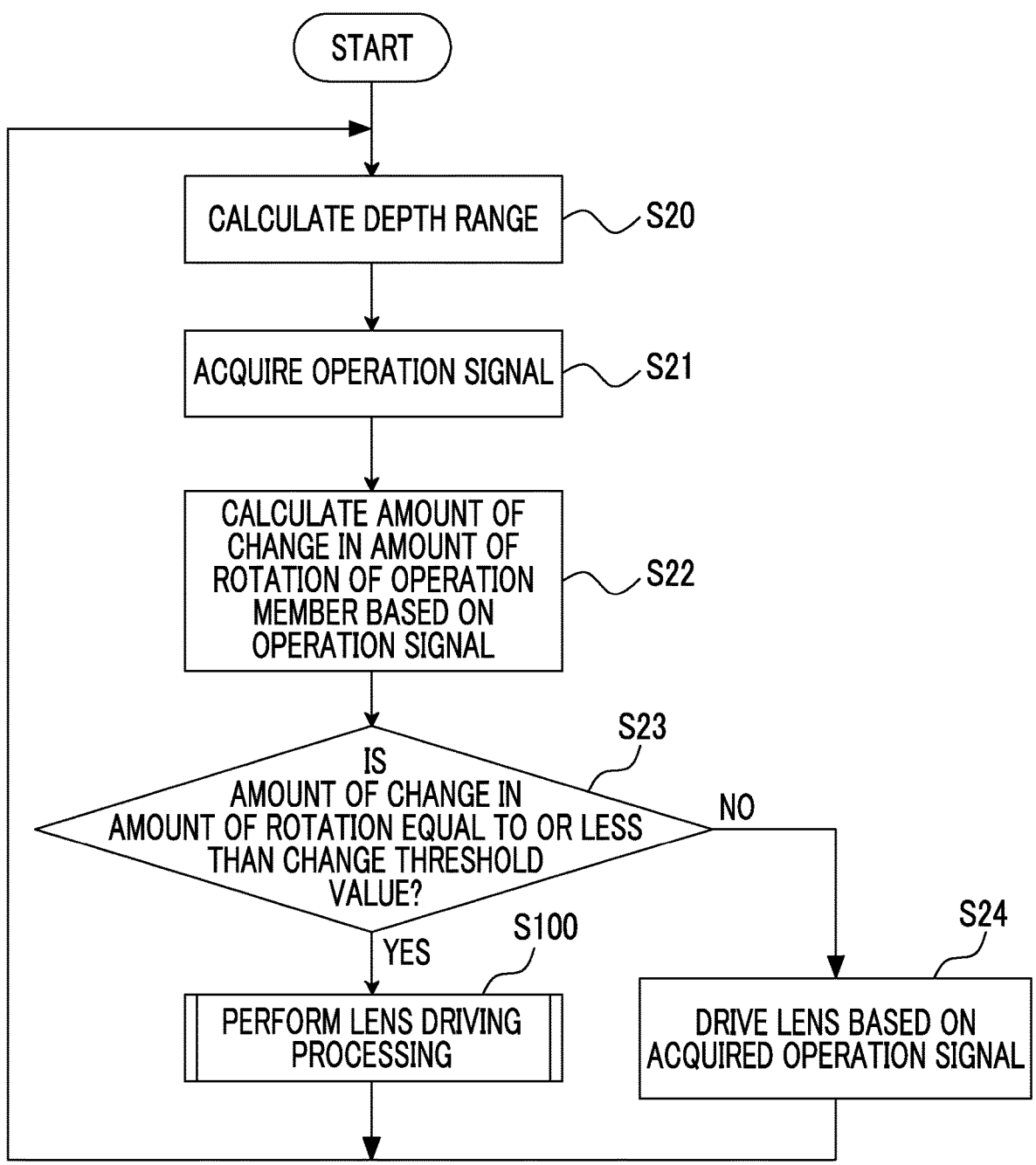
FIG. 9 is a flowchart for explaining lens driving processing executed by the lens control section 21 shown in FIG. 8.

FIG. 9 is a flowchart for explaining the lens driving processing executed by the lens control section 21 shown in FIG. 8. Step S100 shown in FIG. 9 shows the processing from steps S3 to S7 shown in FIG. 4.

In a case where the lens device 11, the focus lens operation device 12 and the camera body 2 are in a communicable state and the imaging system is activated, the depth range calculation section 21b calculates the depth range on the basis of the position of the focus lens 22, the F number of the stop 24, and the position of the zoom lens 20 (step S20). Further, the operation signal acquisition section 21a acquires the operation signal received from the focus lens operation device 12 (step S21).

Next, the change amount calculation section 21g calculates the amount of change in amount of rotation of the operation member 31 on the basis of the operation signal acquired in step S21 (step S22).

The smoothing processing section 21d determines whether the absolute value of the amount of change calculated in step S22 is equal to or less than the change threshold value (step S23).

In a case where it is determined that the absolute value of the amount of change is equal to or less than the predetermined change threshold value (step S23: YES), the processing proceeds to step S100, and the processing of steps S3 to S7 shown in FIG. 4 is performed. After the processing of step S7, the processing returns to step S20.

On the other hand, in a case of determining that the absolute value of the amount of change is greater than the change threshold value (step S23: NO), the smoothing processing section 21d determines that the filter processing is not performed on the operation signal acquired in step S21, and inputs the operation signal directly to the movable lens driving section 21e. Then, the movable lens driving section 21e controls the focus lens driving section 23 on the basis of the input operation signal so as to drive the focus lens 22 (step S24). After step S24, the processing returns to step S20, and the above-mentioned processing is repeatedly executed.

As described above, in a case where the absolute value of the amount of change in amount of rotation of the operation member 31 is greater than the change threshold value, that is, in a situation where a photographer instructs the focus lens 22 to move largely, the operation signal is not smoothed. Thereby, it is possible to improve the responsiveness of driving the focus lens 22 to the operation of the operation member 31.

In this way, by performing the smoothing processing only in a case where the operation member 31 is being rotated at a constant speed, it is possible to improve responsiveness in a case where the focus lens 22 starts moving. This modification example is effective in capturing an image of a rapidly changed subject in sports broadcasting or the like.

On the other hand, in a case where the absolute value of the amount of change in amount of rotation of the operation member 31 is equal to or less than the change threshold value, that is, in a situation where the operation is performed such that the position of the focus lens 22 is not largely changed, the operation signal is smoothed. Thereby, it is possible to suppress a wobble in position of the focus lens 22 and improve the imaging quality.

The smoothing processing section 21d of the lens control section 21 shown in FIG. 8 switches methods of controlling the degree of the smoothing between a first period, in which the amount of change calculated by the change amount calculation section 21g is a positive value and is greater than or equal to the first threshold value, and a period other than the first period, or switches the methods of controlling the degree of the smoothing between a second period, in which the amount of change is a negative value and is less than the second threshold value, and a period other than the second period.

Figure 10:
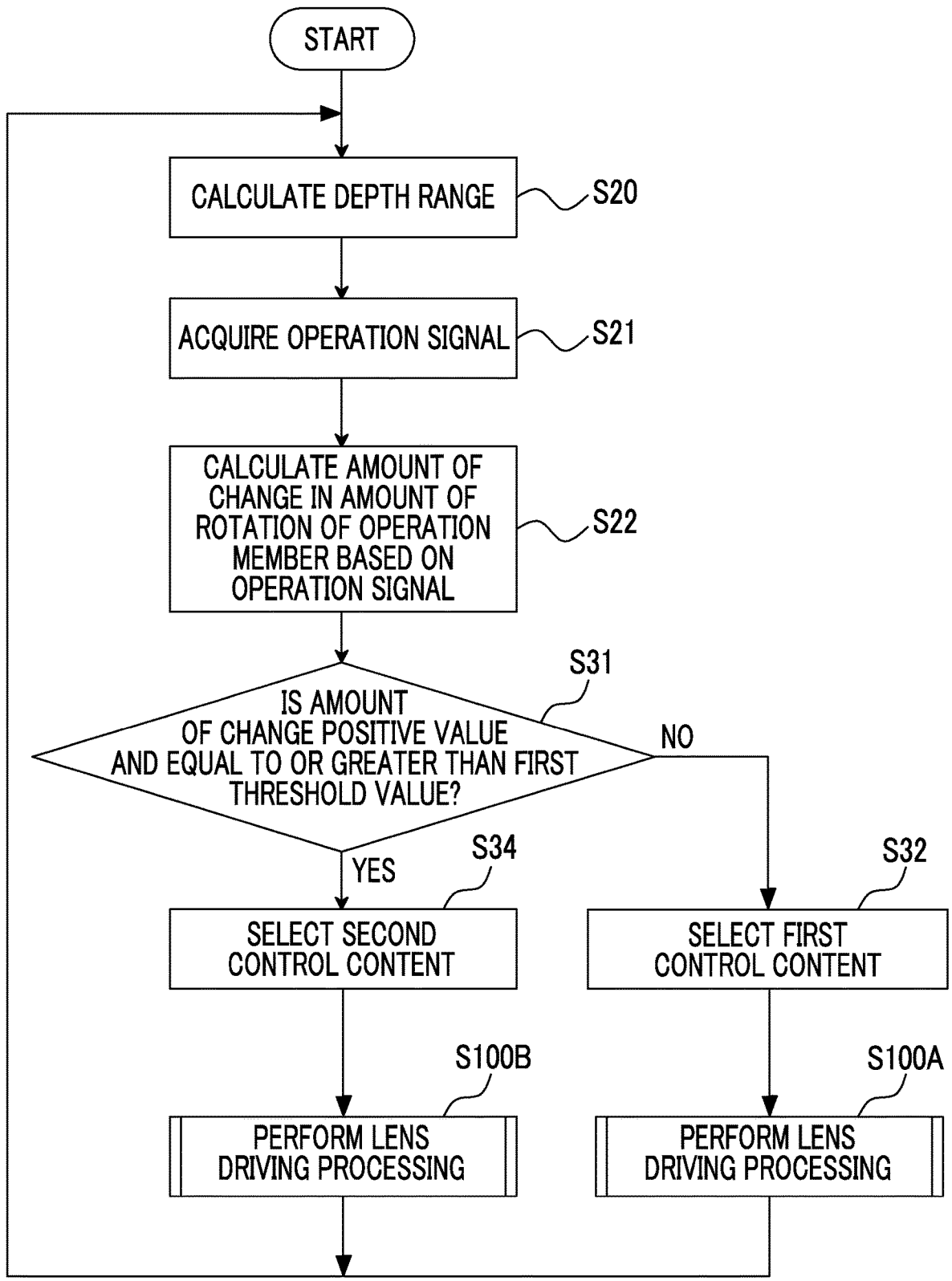
FIG. 10 is a flowchart for explaining a modification example of the lens driving processing executed by the lens control section 21 shown in FIG. 8.

FIG. 10 is a flowchart for explaining a modification example of the lens driving processing executed by the lens control section 21 shown in FIG. 8. In FIG. 10, each processing, which is the same as that in FIG. 9, is represented by each same reference numeral and sign, and description thereof will be omitted. In FIG. 10, steps S100A and S100B each show the processing of steps S3 to S7 shown in FIG. 4. In step S22, it is assumed that the amount of change is calculated by subtracting the previous amount of rotation from the current amount of rotation.

After step S22, the smoothing processing section 21d determines whether or not the amount of change calculated in step S22 is a positive value and is equal to or greater than the first threshold value (step S31).

In a case of determining that the amount of change calculated in step S22 is a positive value and is equal to or greater than the first threshold value (step S31: YES), the smoothing processing section 21d selects a second control content of the smoothing processing shown in FIG. 11 (step S34). Thereafter, the smoothing processing section 21d performs the processing of steps S3 to S7 shown in FIG. 4 (step S100B). In addition, the smoothing processing section 21d controls the degree of the smoothing in accordance with the data shown in FIG. 11 in the processing of steps S5 and S6 in step S100B.

In a case of determining that the amount of change calculated in step S22 is a positive value and is not equal to or greater than the first threshold value (step S31: NO), the smoothing processing section 21d selects a first control content of the smoothing processing shown in FIG. 3 (step S32). Thereafter, the smoothing processing section 21d performs the processing of steps S3 to S7 shown in FIG. 4 (step S100A). In addition, the smoothing processing section 21d controls the degree of the smoothing in accordance with the data shown in FIG. 3 in the processing of steps S5 and S6 in step S100A.

Figure 11:
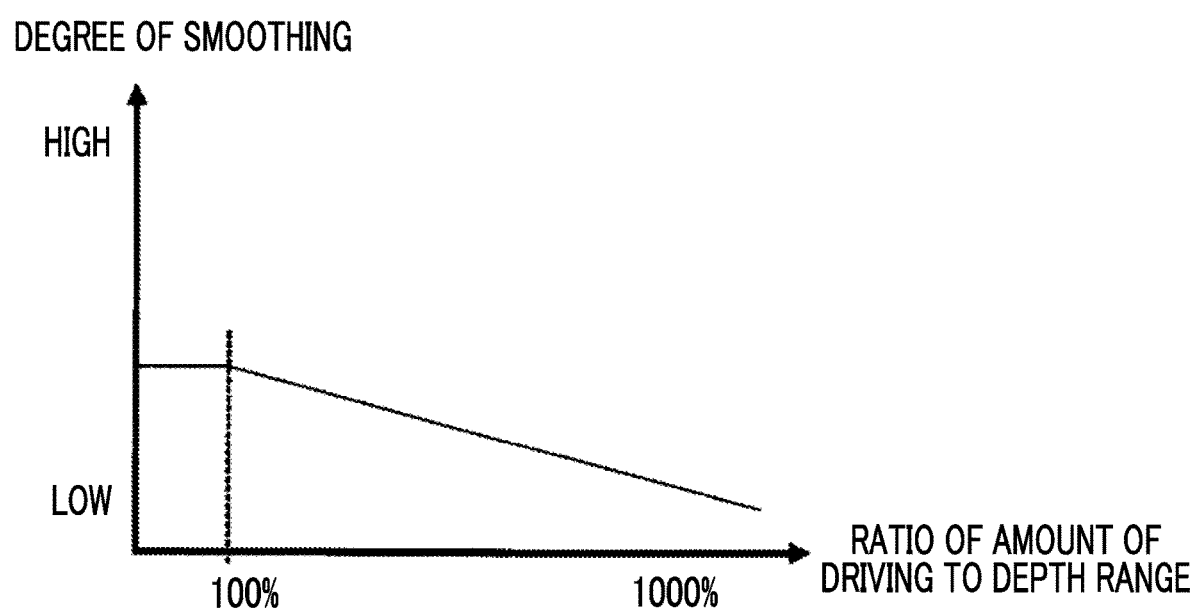
FIG. 11 is a diagram illustrating another example of the relationship between the degree of the smoothing and the ratio of the amount of driving to the depth range.

In the second control content shown in FIG. 11, in a case where the ratio in the horizontal axis is equal to or less than the ratio threshold value (=100%), the degree of the smoothing is lower than that of the first control content shown in FIG. 3. Further, in the second control content shown in FIG. 11, in a case where the ratio in the horizontal axis is greater than the ratio threshold value, the inclination of the straight line of the degree of the smoothing is gentler than that in the first control content shown in FIG. 3.

In a case where the ratio in the horizontal axis is an optional value, the second control content and the first control content may be set such that the degree of the smoothing is higher in the first control content than in the second control content.

After step S100A or step S100B, the processing returns to step S20, and the above-mentioned processing is repeatedly executed.

According to the operation example shown in FIG. 10, the first period during which the focus lens 22 is accelerated is different from the period during which the focus lens 22 is decelerated or moved at a constant speed in that the smoothing in the first period is performed at a relatively low degree.

For example, imaging may be performed as follows. From a state where the target subject is not in focus, the focus lens 22 is quickly moved and the focus lens 22 is stopped to focus on a target subject. In this case, the degree of the smoothing is set to be low while the operation of moving the focus lens 22 to the vicinity of the target position is performed. Thereby, it is possible to improve the responsiveness.

Figure 12:
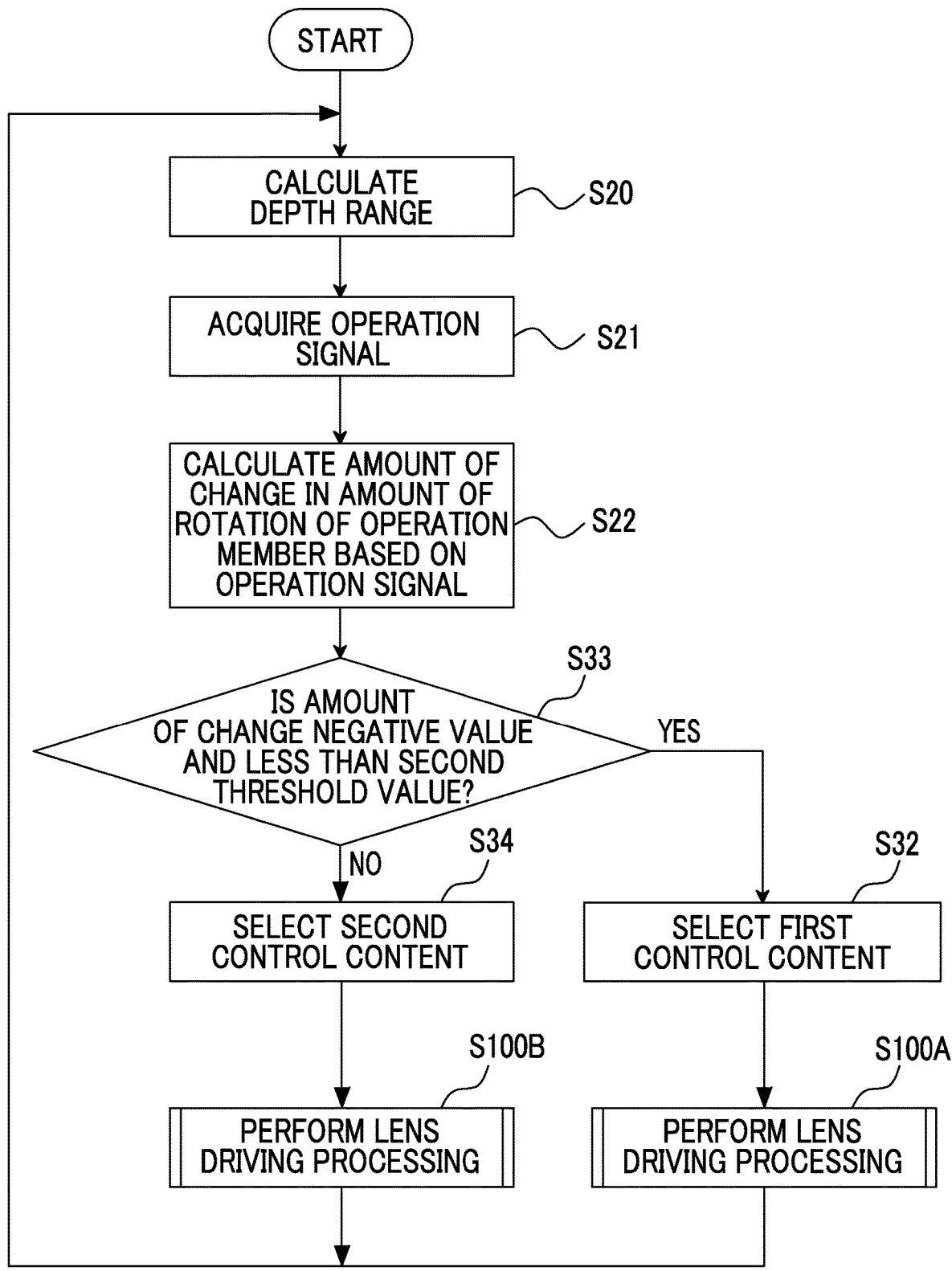
FIG. 12 is a flowchart for explaining a modification example of the lens driving processing executed by the lens control section 21 shown in FIG. 8.

FIG. 12 is a flowchart for explaining a modification example of the lens driving processing executed by the lens control section 21 shown in FIG. 8. In FIG. 12, each processing, which is the same as that in FIG. 10, is represented by each same reference numeral and sign, and description thereof will be omitted.

After step S22, the smoothing processing section 21d determines whether or not the amount of change calculated in step S22 is a negative value and is less than the second threshold value (step S33).

In a case of determining that the amount of change calculated in step S22 is a negative value and is less than the second threshold value (step S33: YES), the smoothing processing section 21d performs the processing in step S32 and subsequent steps. In a case of determining that the amount of change calculated in step S22 is a negative value and is not less than the second threshold value (step S33: NO), the smoothing processing section 21d performs the processing in step S34 and subsequent steps.

According to the operation example shown in FIG. 12, the second period during which the focus lens 22 is decelerated is different from the period during which the focus lens 22 is accelerated or moved at a constant speed in that the smoothing in the second period is performed at a relatively high degree.

For example, imaging may be performed as follows. From a state where the target subject is not in focus, the focus lens 22 is moved and the focus lens 22 is stopped to focus on a target subject. In this case, immediately before the focus lens 22 is stopped, that is, in the vicinity of the target position, the operation signal is highly smoothed. Therefore, it is possible to improve the imaging quality.

Figure 13:
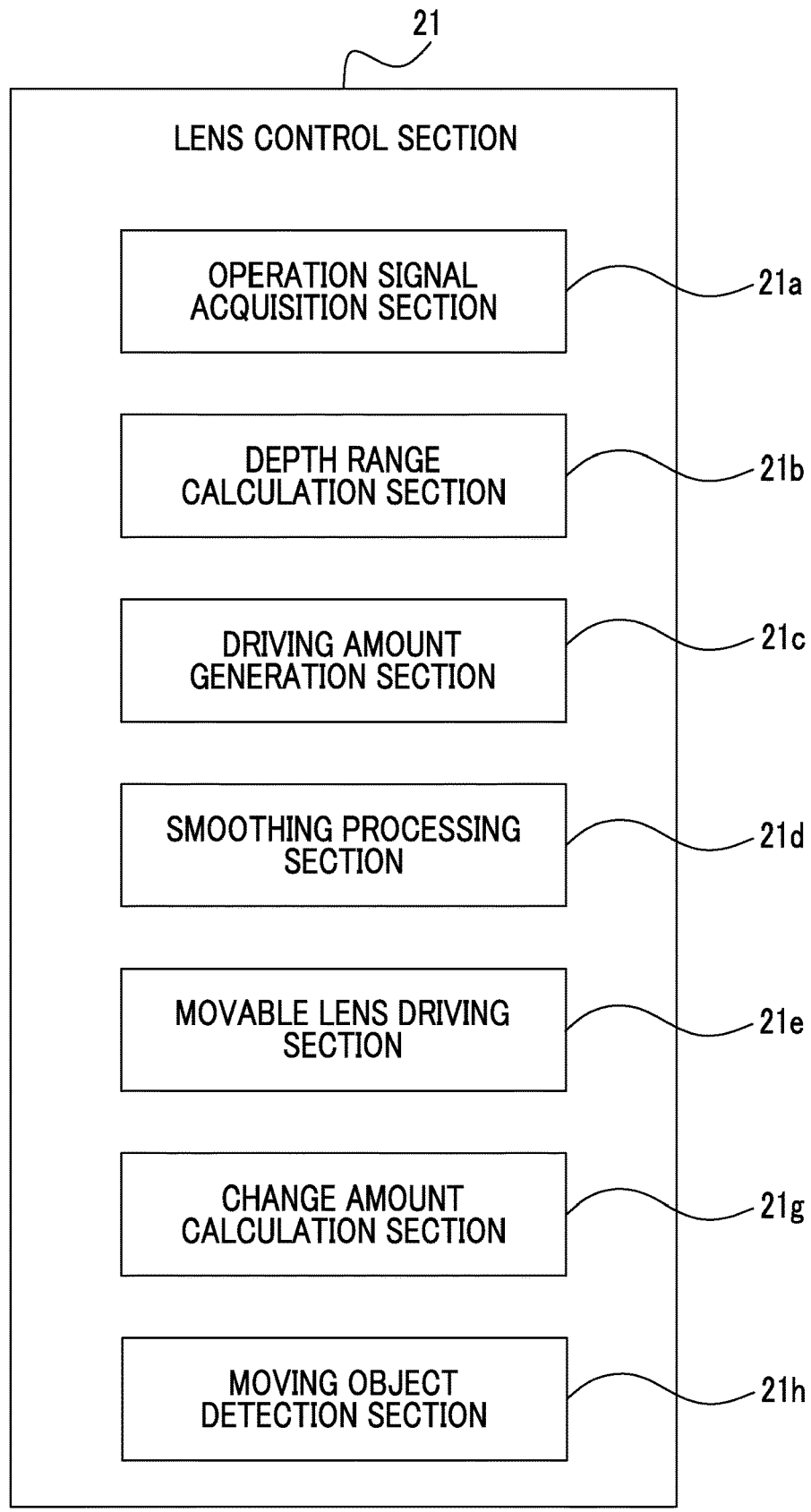
FIG. 13 is a diagram illustrating a modification example of the functional block of the lens control section 21 shown in FIG. 1.

FIG. 13 is a diagram illustrating a modification example of the functional block of the lens control section 21 shown in FIG. 1. The lens control section 21 shown in FIG. 13 has the same configuration as that of FIG. 8 except that a moving object detection section 21h is added. The moving object detection section 21h is configured such that the processor of the lens control section 21 executes the program stored in the ROM.

The moving object detection section 21h acquires the video signal generated by the image processing section 42 of the camera body 2, detects a moving object from the video signal, and inputs the detection result to the smoothing processing section 21d.

The smoothing processing section 21d sets the change threshold value in step S23 of FIG. 9 to a first value in a case where the moving object detection section 21h detects a moving object, and sets the change threshold value in step S23 of FIG. 9 to the second value in a case where the moving object detection section 21h detects no moving object. The first value is greater than the second value.

An increase in change threshold value means that it becomes easy to perform the smoothing of the operation signal. In a case where a moving object is included in the subject being imaged, in order to follow the moving object, an operation such as moving the entire imaging system with a tripod or changing the position of the zoom lens 20 is performed. That is, in the situation, it becomes difficult to concentrate on the operation of the operation member 31. For this reason, by facilitating smoothing of the operation signal in such a situation, it is possible to prevent the imaging quality from deteriorating.

In the embodiment described with reference to FIGS. 8 to 13, information on the amount of change in phase difference as described in FIGS. 5 to 7 may be used as the information used by the smoothing processing section 21d to control the degree of the smoothing.

Each of the imaging systems shown in FIGS. 1 and 5 may be a system in which the lens system 1 can be attached to and detached from the camera body 2, or may be a system in which the camera body 2 and the lens system 1 are fixed. Further, the lens device 11 or 11A and the focus lens operation device 12 may be integrated.

Further, in the present embodiment, the focus lens is described as an example of the movable lens, but the present invention is applicable not only to the focus lens but also to the zoom lens.

As explained above, the following items are disclosed in this specification.

The disclosed lens device comprises: a movable lens that is movable in a direction of an optical axis; an operation signal acquisition section that acquires an operation signal corresponding to an amount of movement of an operation member which is movable; a smoothing processing section that smooths the operation signal; and a movable lens driving section that drives the movable lens on the basis of the smoothed operation signal.

In the disclosed lens device, the smoothing processing section controls a degree of the smoothing.

In the disclosed lens device, the movable lens includes a focus lens. The lens device further comprises a depth range calculation section that calculates a depth range for being in focus based on a position of the focus lens, and a driving amount generation section that generates an amount of driving of the focus lens on the basis of the operation signal. In addition, the smoothing processing section controls the degree of the smoothing on the basis of the depth range and the amount of driving.

In the disclosed lens device, the smoothing processing section controls the degree of the smoothing on the basis of a ratio of the amount of driving to the depth range.

In the disclosed lens device, the movable lens includes a focus lens. The lens device further comprises a depth range calculation section that calculates a depth range for being in focus based on a position of the focus lens, and a phase difference calculation section that calculates a phase difference on the basis of light passing through the movable lens. In addition, the smoothing processing section controls the degree of the smoothing on the basis of the depth range and an amount of change in phase difference.

In the disclosed lens device, the smoothing processing section controls the degree of the smoothing on the basis of a ratio of an amount of driving of the focus lens, which is based on the amount of change in phase difference, to the depth range.

In the disclosed lens device, the smoothing processing section decreases the degree of the smoothing as the ratio increases in a case where the ratio is greater than the ratio threshold value.

The disclosed lens device further comprises a change amount calculation section that calculates an amount of change in the amount of movement of the operation member on the basis of the operation signal. The smoothing processing section switches methods of controlling the degree of the smoothing between a first period, in which the amount of change calculated by the change amount calculation section is a positive value and is greater than or equal to the first threshold value, and a period other than the first period, or switches the methods of controlling the degree of the smoothing between a second period, in which the amount of change calculated by the change amount calculation section is a negative value and is less than the second threshold value, and a period other than the second period.

The disclosed lens device further comprises a change amount calculation section that calculates an amount of change in the amount of movement of the operation member on the basis of the operation signal. The smoothing processing section performs the smoothing processing in a case where an absolute value of the amount of change calculated by the change amount calculation section is equal to or less than a change threshold value.

The disclosed lens device further comprises a moving object detection section that detects a moving object from a subject image captured through the movable lens. The smoothing processing section makes the change threshold value, which is obtained in a case where the moving object is detected, greater than the change threshold value which is obtained in a case where the moving object is not detected.

The disclosed lens device has the operation member.

The disclosed imaging apparatus comprises: the lens device; and an imaging element that captures an image of a subject through the movable lens.

The disclosed lens driving method comprises: an operation signal acquisition step of acquiring an operation signal corresponding to an amount of movement of an operation member which is movable and which is for operating a movable lens movable in a direction of an optical axis; a smoothing processing step of smoothing the operation signal; and a movable lens driving step of driving the movable lens on the basis of the smoothed operation signal.

In the disclosed lens driving method, the smoothing processing step controls a degree of the smoothing.

In the disclosed lens driving method, the movable lens includes a focus lens. The lens driving method further comprises a depth range calculation step of calculating a depth range for being in focus based on a position of the focus lens, and a driving amount generation step of generating an amount of driving of the focus lens on the basis of the operation signal. The smoothing processing step controls the degree of the smoothing on the basis of the depth range and the amount of driving.

In the disclosed lens driving method, the smoothing processing step controls the degree of the smoothing on the basis of a ratio of the amount of driving to the depth range.

In the disclosed lens driving method, the movable lens includes a focus lens. The lens driving method further comprises a depth range calculation step of calculating a depth range for being in focus based on a position of the focus lens, and a phase difference calculation step of calculating a phase difference on the basis of light passing through the movable lens. In addition, the smoothing processing step controls the degree of the smoothing on the basis of the depth range and an amount of change in phase difference.

In the disclosed lens driving method, the smoothing processing step controls the degree of the smoothing on the basis of a ratio of an amount of driving of the focus lens, which is based on the amount of change in phase difference, to the depth range.

In the disclosed lens driving method, the smoothing processing step decreases the degree of the smoothing as the ratio increases in a case where the ratio is greater than the ratio threshold value.

The disclosed lens driving method further comprises a change amount calculation step of calculating an amount of change in the amount of movement of the operation member on the basis of the operation signal. The smoothing processing step switches methods of controlling the degree of the smoothing between a first period, in which the amount of change calculated through the change amount calculation step is a positive value and is greater than or equal to the first threshold value, and a period other than the first period, or switches the methods of controlling the degree of the smoothing between a second period, in which the amount of change calculated through the change amount calculation step is a negative value and is less than the second threshold value, and a period other than the second period.

The disclosed lens driving method further comprises a change amount calculation step of calculating an amount of change in the amount of movement of the operation member on the basis of the operation signal. The smoothing processing step performs the smoothing processing in a case where an absolute value of the amount of change calculated through the change amount calculation step is equal to or less than a change threshold value.

The disclosed lens driving method further comprises a moving object detection step of detecting a moving object from a subject image captured through the movable lens. The smoothing processing step makes the change threshold value, which is obtained in a case where the moving object is detected, greater than the change threshold value which is obtained in a case where the moving object is not detected.

The disclosed lens driving program causes a computer to execute: an operation signal acquisition step of acquiring an operation signal corresponding to an amount of movement of an operation member which is movable and which is for operating a movable lens movable in a direction of an optical axis; a smoothing processing step of smoothing the operation signal; and a movable lens driving step of driving the movable lens on the basis of the smoothed operation signal.

The present invention is highly convenient and effective in a case where it is applied particularly to a TV camera for broadcasting mainly for capturing a moving image and the like.

The present invention has been hitherto described with reference to the specific embodiments. However, the present invention is not limited to the embodiments, and may be modified into various forms without departing from the technical scope of the present invention.

This application is on the basis of Japanese Patent Application (JP2016-070727A) filed on Mar. 31, 2016, the content of which is incorporated herein by reference.

What is claimed is:

1. A lens device comprising:
a movable lens that is movable in a direction of an optical axis and comprises a focus lens;
a processor, configured to:
acquire an operation signal corresponding to an amount of movement of an operation member which is movable;
smooth the operation signal; and
drive the movable lens based on the smoothed operation signal,
calculate a depth range for being in focus based on a position of the focus lens;
generate an amount of driving of the focus lens based on the operation signal; and
control a degree of the smoothing based on the depth range and the amount of driving.

2. The lens device according to claim 1,
wherein the processor controls the degree of the smoothing based on a ratio of the amount of driving to the depth range.

3. The lens device according to claim 2,
wherein the processor decreases the degree of the smoothing as the ratio increases in a case where the ratio is greater than a ratio threshold value.

4. The lens device according to claim 1,
wherein the processor further calculates an amount of change in the amount of movement of the operation member based on the operation signal
and switches methods of controlling the degree of the smoothing between a first period, in which the calculated amount of change is a positive value and is greater than or equal to a first threshold value, and a period other than the first period, or switches the methods of controlling the degree of the smoothing between a second period, in which the calculated amount of change is a negative value and is less than a second threshold value, and a period other than the second period.

5. The lens device according to claim 1,
wherein the processor further calculates an amount of change in the amount of movement of the operation member based on the operation signal
and performs the smoothing in a case where an absolute value of the calculated amount of change is equal to or less than a change threshold value.

6. The lens device according to claim 5,
wherein the processor further detects a moving object from a subject image captured through the movable lens
and makes the change threshold value, which is obtained in a case where the moving object is detected, greater than the change threshold value which is obtained in a case where the moving object is not detected.

7. The lens device according to claim 1, further comprising
the operation member.

8. An imaging apparatus comprising:
the lens device according to claim 7; and
an imaging element that captures an image of a subject through the movable lens.

9. A lens device comprising:
a movable lens that is movable in a direction of an optical axis and comprises a focus lens;
a processor, configured to:
acquire an operation signal corresponding to an amount of movement of an operation member which is movable;
smooth the operation signal; and
drive the movable lens based on the smoothed operation signal;
calculate a depth range for being in focus based on a position of the focus lens;
calculate a phase difference based on light passing through the movable lens, and control a degree of the smoothing based on the depth range and an amount of change in the phase difference.

10. The lens device according to claim 9,
wherein the processor controls the degree of the smoothing based on a ratio of an amount of driving of the focus lens, which is based on the amount of change in the phase difference, to the depth range.

11. A lens driving method comprising:
acquiring an operation signal corresponding to an amount of movement of an operation member which is movable and which is for operating a movable lens movable in a direction of an optical axis;
smoothing the operation signal;
driving the movable lens based on the smoothed operation signal;
calculating a depth range for being in focus based on a position of a focus lens included in the movable lens; and
generating an amount of driving of the focus lens based on the operation signal,
wherein a degree of the smoothing is controlled based on the depth range and the amount of driving.

12. The lens driving method according to claim 11,
wherein the degree of the smoothing is controlled based on a ratio of the amount of driving to the depth range.

13. The lens driving method according to claim 12,
wherein the degree of the smoothing decreases as the ratio increases in a case where the ratio is greater than a ratio threshold value.

14. The lens driving method according to claim 11, further comprising
calculating an amount of change in the amount of movement of the operation member based on the operation signal,
wherein methods of controlling the degree of the smoothing between a first period, in which the calculated amount of change is a positive value and is greater than or equal to a first threshold value, and a period other than the first period, are switched, or the methods of controlling the degree of the smoothing between a second period, in which the calculated amount of change is a negative value and is less than a second threshold value, and a period other than the second period are switched.

15. The lens driving method according to claim 11, further comprising
calculating an amount of change in the amount of movement of the operation member based on the operation signal,
wherein the smoothing is performed in a case where an absolute value of the calculated amount of change is equal to or less than a change threshold value.

16. The lens driving method according to claim 15, further comprising
a moving object detection step of detecting a moving object from a subject image captured through the movable lens,
wherein the smoothing processing step makes the change threshold value, which is obtained in a case where the moving object is detected, greater than the change threshold value which is obtained in a case where the moving object is not detected.

17. A lens driving method comprising:
acquiring an operation signal corresponding to an amount of movement of an operation member which is movable and which is for operating a movable lens movable in a direction of an optical axis;
smoothing the operation signal;
driving the movable lens based on the smoothed operation signal;
calculating a depth range for being in focus based on a position of a focus lens included in the movable lens; and
calculating a phase difference based on light passing through the movable lens,
wherein a degree of the smoothing is controlled based on the depth range and an amount of change in the phase difference.

18. The lens driving method according to claim 17,
wherein the degree of the smoothing is controlled based on a ratio of an amount of driving of the focus lens, which is based on the amount of change in the phase difference, to the depth range.

19. A non-transitory computer readable medium storing a lens driving program causing a computer to execute:
acquiring an operation signal corresponding to an amount of movement of an operation member which is movable and which is for operating a movable lens movable in a direction of an optical axis;
smoothing the operation signal;
driving the movable lens based on the smoothed operation signal;
calculating a depth range for being in focus based on a position of a focus lens included in the movable lens; and
generating an amount of driving of the focus lens based on the operation signal,
wherein a degree of the smoothing is controlled based on the depth range and the amount of driving.

20. A non-transitory computer readable medium storing a lens driving program causing a computer to execute:
acquiring an operation signal corresponding to an amount of movement of an operation member which is movable and which is for operating a movable lens movable in a direction of an optical axis;
smoothing the operation signal;
driving the movable lens based on the smoothed operation signal;
calculating a depth range for being in focus based on a position of a focus lens included in the movable lens; and
calculating a phase difference based on light passing through the movable lens,
wherein a degree of the smoothing is controlled based on the depth range and an amount of change in the phase difference.

* * * * *